April 6, 1954     P. H. CARDWELL     2,674,323
METHOD OF PREVENTING EARTH PARTICLES FROM BEING CARRIED
INTO A WELL BORE IN AN INCOMPETENT EARTH FORMATION
Filed Aug. 23, 1951
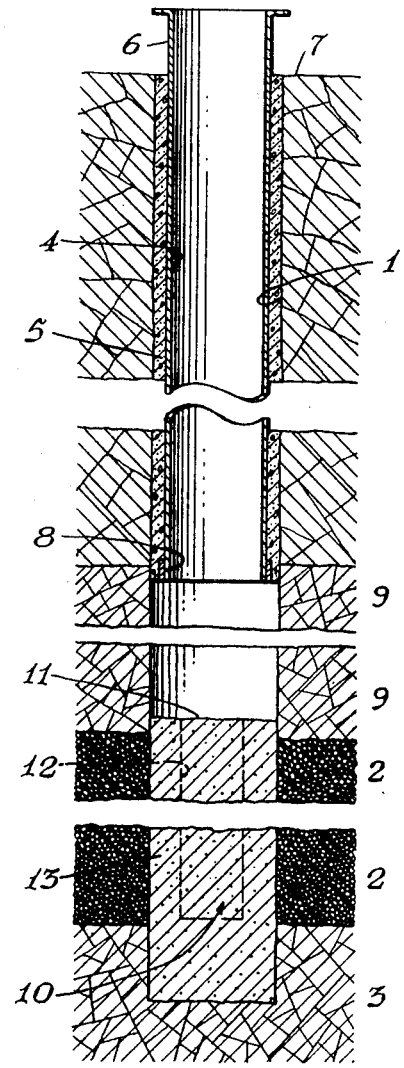
INVENTOR.
Paul H. Cardwell
BY
Griswold & Burdick
ATTORNEYS

Patented Apr. 6, 1954

2,674,323

UNITED STATES PATENT OFFICE 2,674,323

METHOD OF PREVENTING EARTH PARTICLES FROM BEING CARRIED INTO A WELL BORE IN AN INCOMPETENT EARTH FORMATION

Paul H. Cardwell, Tulsa, Okla., assignor to The Dow Chemical Company, Midland, Mich., a corporation of Delaware Application August 23, 1951, Serial No. 243,251

1 Claim. (Cl. 166—26)

The invention relates to well holes formed in the earth and more particularly concerns those drilled into an incompetent formation from which it is desired to obtain oil, gas, or other fluid without the usual difficulties attendant upon such operations.

The usual difficulty of obtaining the fluid of an incompetent formation from a well therein is that earth particles are carried into the well with the fluid. Besides leading to collapsing or sloughing of the well hole wall, the earth particles carried away with the produced fluid cause other difficulties such as clogging of well screens, damage to pumping equipment, etc.

Among the methods proposed for ameliorating these difficulties is to place a gravel packing or filling in the well bore opposite the incompetent formation with the object of holding the formation in place and straining earth particles from the produced fluid. However, such procedures are not wholly satisfactory. When a fairly coarse gravel or granular filling is used, the well bore is prevented from sloughing but the finer earth particles work through the interstices of the filling with the produced fluid and contaminate it. On the other hand, if a relatively fine filling material is used, particles of it tend to be carried away with the produced fluid.

In overcoming these difficulties, according to the present invention, I deposit in the well bore opposite the incompetent formation a conventional granular filling material such as a gravel packing, as by introducing into the well bore the requisite quantity of a granular material as a fill either in the open well hole or behind casing if present, and then I cement the granules together without blocking the interstices to fluid flow.

Various granular packing materials may be used for the filling of which the following examples are illustrative:

EXAMPLE 1

Crushed rock: passing a ⅜ inch mesh screen but retained upon 10 mesh screen.

EXAMPLE 2

| Silica sand: | Per cent |
|---|---|
| Particle size— | |
| Passing 10 mesh screen | 100 |
| Retained on 40 mesh screen | 98 |
| Retained on 60 mesh screen through 40 mesh | 1.5 |
| Retained on 80 mesh screen through 60 mesh | 0.5 |

EXAMPLE 3

| Silica sand: | Per cent |
|---|---|
| Passing 10 mesh screen | 100 |
| Retained on 40 mesh screen | 74 |
| Retained on 60 mesh screen through 40 mesh | 18 |
| Retained on 80 mesh screen through 60 mesh | 6 |
| Retained on 100 mesh screen through 80 mesh | 1.5 |
| Retained on 200 mesh screen through 100 mesh | 0.5 |

EXAMPLE 4

| Silica sand: | Per cent |
|---|---|
| Passing 10 mesh screen | 100 |
| Retained on 40 mesh screen | 3.0 |
| Retained on 60 mesh screen through 40 mesh | 6.5 |
| Retained on 80 mesh screen through 60 mesh | 53.5 |
| Retained on 100 mesh screen through 80 mesh | 21.0 |
| Retained on 200 mesh screen through 100 mesh | 14.5 |
| Retained on 325 mesh screen through 200 mesh | 1.5 |

EXAMPLE 5

| Ground rock: | Per cent |
|---|---|
| Passing 10 mesh screen | 100 |
| Retained on 100 mesh screen | 1.0 |
| Retained on 200 mesh screen through 100 mesh | 11.0 |
| Retained on 250 mesh screen through 200 mesh | 4.0 |
| Retained on 325 mesh screen through 250 mesh | 20.0 |
| Through 325 mesh screen | 64.0 |

The packing or filling of granular material, such as one of the foregoing formulations, is deposited in the well hole in the usual way.

After the filling is in place, I then treat the same to consolidate it while leaving the interstices open to fluid flow. In order to achieve binding of the particles without blocking the interstices, I employ a special binding agent comprising a liquid mixture containing resin-forming ingredients from which a resinous cementing or binding agent is produced as the resin-forming ingredients therein react in situ in the interstices of the filling, the volume of the resin-forming ingredients being substantially less than that of the liquid mixture. The resinous binding agent thus deposited has a relatively small volume compared to that of the liquid mixture so that interstices of the filling initially filled with the liquid mixture are not blocked when the resinous binding agent is deposited from the liquid mixture. Instead, the resinous binding agent coats and envelops the individual particles, the binding agent filling only the spaces in immediate vicinity of each point of contact of one particle with another, leaving the balance of the interstitial space free for fluid flow.

The resin-forming liquid mixtures set forth in my copending application Serial No. 636,272, filed December 20, 1945, now abandoned, and in my copending application Serial No. 243,351, filed concurrently herewith are used in the method. The desired cementing action is obtained by inundating the fill of granular material in the well bore with a suitably diluted partially condensed resinous liquid formed from the mixtures of phenol and formaldehyde which on being suitably catalyzed form an unemulsified two-phase system of a relatively small volume of a resin which hardens in situ in the presence of the diluent. The diluent used is soluble in the partially condensed resinous liquid mixture, as placed in the interstices of the granular filling, but insoluble in the hardened resin after its formation in situ and is rejected from the mixture as one of the two resulting continuous liquid phases in the interstices of the particles of the granular filling material while the resin, which is the other of the two continuous liquid phases, gels and hardens. The gelled resin hardens around the particles of the filling material. The hardened resin has a specific gravity of about 1.2, is free from diluent, and occupies a smaller volume than the partially condensed resinous liquid mixture with which the fill is initially inundated. The hardened resin forms as a continuous diluent-free coating on the particles of the filling material while the rejected resin-free diluent occupies the remainder of the interstitial space in the filling material until displaced by another fluid such as the fluid produced from the earth formation. The coating of the hardened resin is bonded to the particles of the filling material and holds them together while the diluent leaves sufficient interstitial space for fluid flow. Hence, even though the interstitial space in the filling material is initially completely filled with the resin-forming liquid mixture, when inundated in carrying out a treatment, the permeability of the filling material to the flow of fluid therethrough, after the deposit of solid resin has formed, is not destroyed but may be as much as 30 to 50 per cent of the original permeability. Some of the diluted resin-forming liquid also impregnates the earth formation adjacent to the granular filling and cements the earth particles together in similar manner to that in the filling material and also holds the filling in the well hole.

The partially condensed resinous liquid mixture is formed from phenol and formaldehyde (or paraformaldehyde) and an alkaline catalyst (e. g. an alkali metal hydroxide or carbonate) in the following proportions per mole of phenol:

Formaldehyde_____ 0.75 to 2.0 moles as HCHO.
Alkali catalyst_____ 0.015 to 0.6 mole (calculated as NaOH equivalent).
Water_____ Up to 20 moles.

The mixture is reacted, preferably at about 175° F. in a covered vented vessel at atmospheric pressure, until the viscosity, measured at 80° F., is between about 25 to 200 centipoises (cps.). The reaction is exothermic, and, as it gets under way, it is necessary to employ cooling means to prevent the mixture from becoming overheated. After the viscosity reaches a value in the specified range, the mixture is acidified to a pH between about 4 and 6 and it is then allowed to settle whereupon it separates into two layers. The water layer, which is on top, is rejected. The lower resinous liquid layer has a viscosity of 100 to 2000 cps. depending upon the length of time the mixture has been reacted.

The following specific example is illustrative of the preparation of the partially resinified or condensed phenol-formaldehyde resin-forming liquid prior to dilution.

*Example*

Mix together 390 pounds (4.15 moles) of phenol, 506 pounds of 37 per cent by weight formaldehyde (6.24 moles HCHO), and 25 pounds of sodium hydroxide (0.625 mole) dissolved in 25 pounds of water. The total weight of the foregoing mixture is 946 pounds and its density at 80° F. 9.3 pounds per gallon. The mixture is heated to 175° F. in a vented jacketed reaction vessel. As the reaction proceeds, cooling water is circulated in the jacket to prevent the reaction mass from becoming hotter than about 175° F. After the viscosity reaches 47 cps., the reaction mass is cooled to 80° F. Its weight is then 937.8 pounds and density 9.75 pounds per gallon. To the cooled mass is added 7.8 gallons of 32 per cent HCl (0.66 mole HCl) with stirring, thereby reducing the pH to 5 and increasing the total weight of the resulting mixture to 1013.5 pounds having a volume of 104 gallons. The acidified mixture is settled allowing the formation of two liquid layers. The top layer, which consists mainly of sodium chloride dissolved in water, weighs 334.2 pounds; its density is 9.27 pounds per gallon, its viscosity 3 cps. It is rejected. The lower liquid layer consists of 697.3 pounds of resinous liquid having a density of 10.0 pounds per gallon and viscosity at 80° F. of 230 cps. and is ready for use in the method, although, if desired, the liquid may be stored at room temperature for long periods before use without significant change. When it is desired to make a treatment of an earth formation, the diluent is added as well as the catalyst which induces hardening of the resin in situ. The resin thus hardened becomes a continuous phase free from entrapped diluent which is free to pass from the resin.

Suitable diluents are ethyl alcohol, methyl alcohol, and isopropyl alcohol, the amount (by volume) to use may be from about 10 to 75 per cent of the volume of the partially condensed resinous liquid mixture. The diluent becomes a continuous liquid phase (not droplets) free from resin as the resin forms and hardens in situ.

The time elapsing before hardening of the resin and good cementing action occurs on the loose particles of the filling material in the presence of the diluent varies with the temperature and amount of catalyst added. In addition, the state in the transformation of the prepared resin-forming liquid into the resin in situ, at which the resinification is adjudged to have reached the solid state, is somewhat indistinct, because the mass generally passes from a true liquid into the two phase system in which one of the phases becomes a hard solid by degrees of change in which the resinous liquid passes through a semi-solid or gelled state and acquires an initial hardness which increases with time. Resins of this type may be referred to as having an initial set or gelled state as well as a final set or hard state. The time elapsing before these states are reached may be termed the initial setting and final setting times, respectively.

The amount of catalyst to add to the prepared resin-forming liquid mixture before its introduction into the filling material is based upon the percentage of dilution and the amount of phenol in the liquid mixture. Inasmuch as the time required for the inundation of the granular filling usually varies from well to well, it is desirable to employ an amount of catalyst which will allow ample time for the majority of cases before gelation or initial hardening of the resin occurs, for example 2 hours. If more time is required for the inundation, somewhat less catalyst may be used and if hardening is desired sooner more catalyst may be used.

The following table sets forth the number of moles of alkali, calculated as NaOH, to use per mole of phenol in the partially condensed resin-forming liquid mixture to produce gelation of the resin and rejection of the diluent in situ in 2 hours at 140° F. The gelled resin becomes hard in about 24 hours or in a length of time equal to about 12 times the gelation time.

TABLE

| Percent by volume of diluent used | 20 | 30 | 40 | 50 | 60 | 70 |
|---|---|---|---|---|---|---|
| Moles of NaOH per mole of phenol | 0.024 | 0.037 | 0.053 | 0.081 | 0.112 | 0.182 |

The alkali (e. g. NaOH, KOH, $Na_2CO_3$, $K_2CO_3$) used as the catalyst is dissolved in water to make preferably a 25 per cent solution and the solution is added to the appropriately diluted resin-forming liquid mixture in the proportions shown in the table. Intermediate proportions may be obtained by interpolation, others by extrapolation.

The practice of the invention may be facilitated by reference to the accompanying drawing illustrating a mode of carrying out the method in a conventional well. In the drawing, the single figure is a schematic view in cross-sectional elevation of a well drilled into the earth. As shown, the bore 1 extends into and through a productive stratum 2, and terminates in a non-productive stratum 3. The upper portion of the bore is provided with a casing 4 which is cemented in place with cement 5. The top 6 of the casing extends above the surface of the earth and the bottom 8 terminates in the top of a consolidated formation 9 as in conventional well construction. It is assumed that stratum 2 is of the unconsolidated type, the sloughing of which is to be controlled or prevented by the practice of the invention.

In carrying the invention into effect, a quantity of granular material is introduced into the well hole 1 to form an unconsolidated filling indicated by numeral 10 extending from below the bottom to above the top of the productive stratum 2, as shown. Such granular filling material is introduced in a conventional manner, as by a gravel dumping bailer (e. g. the bailer shown in U. S. patent to G. L. Matson, No. 2,398,752). Various granular packing or filling materials may be used, for example, any of the granular mixtures set forth above. After placing the granular filling in the well, the filling is inundated with the above-described diluted resin-forming liquid mixture. The amount of such liquid mixture used is preferably just sufficient to fill the well hole to the top, 11, of the filling therein, thus inundating the filling.

After the resin-forming liquid mixture containing the diluent has inundated and permeated the granular filling or packing, so as to fill the interstitial spaces therein, the resin-forming ingredients in the mixture gradually yield a hard resin while the liquid diluent is rejected, the hard resin and rejected diluent occupying the interstitial space. As a result, the particles of granular material become coated and cemented together with a hard resinous material but the interstices remain relatively open permitting fluid flow therethrough because the volume of the resin formed in situ is smaller than that of the mixture of resin-forming material and diluent by an amount substantially equal to the volume of diluent rejected from the mixture. The rejected diluent is in the form of a continuous liquid phase.

After the particles of granular filling have been bonded together by the resin, the well may be produced through the interstices of the resin bonded filling, thereby displacing the rejected diluent. Thus fluids entering the filling 10 from formation 2 displace the diluent and readily pass into the well bore 1 free from earth particles.

If desired increased flow or a lower pressure differential between the well bore 1 and the formation 2 usually may be had, if, after the filling has been cemented as described, an axial bore 12, indicated by the dotted lines, is drilled therein. This operation leaves an annular porous filter element 13 which holds back earth particles and supports the well bore through stratum 2.

As a further illustration of the nature of the effect of the resin treatment of a granular filling, tests were made in which the above-mentioned granular fillings were packed into tubes and crude oil was then forced through the filling so as to measure its permeability before treatment with the resin and again after consolidation with the resin with the following results:

| Filling Material | Permeability in Darcys | |
|---|---|---|
| | before Consolidation | after Consolidation |
| Example 1 | 170 | 25 |
| Example 2 | 100 | 12 |
| Example 3 | 57 | 9 |
| Example 4 | 19 | 3.5 |
| Example 5 | 3 | 0.62 |

In the above tests, consolidation of the filling was effected at 140° F. and the resin binder was deposited about the granules of filling from a liquid mixture composed of the liquid mixture of Example 1 diluted with methyl alcohol in the proportion of 60 per cent of the alcohol and 40 per cent of the resin-forming liquid.

Although the practice of the method has been more particularly illustrated in a cased well having an incompetent stratum penetrated by open hole below the casing, it will be understood that the method may be used in wells in which the casing extends past an incompetent formation. In such instances, the granular material is deposited behind the casing and then inundated with the diluted resin-forming liquid.

This application is a continuation-in-part of my application Serial No. 783,680, filed November 3, 1947, now abandoned.

I claim:

In a method of treating the bore of a well penetrating an incompetent earth formation so as to permit production of fluid from the formation while restraining or preventing sloughing thereof the steps which consist in depositing in the well bore a granular filling material opposite the incompetent formation; cooking together a mixture of phenol, formaldehyde, and an alkali catalyst in the proportions per mole of phenol of 0.75 to 2 moles of formaldehyde, 0.015 to 0.6 mole of alkali calculated as NaOH, and up to 20 moles of water, until the viscosity of the cooked mixture measured at 80° F. is between about 25 to 200 centipoises; acidifying the cooked mixture to a pH between about 4 and 6 whereby a system of two liquids forms, one of the two liquids being a liquid resin, the other an aqueous salt solution; separating the liquid resin from the aqueous salt solution; diluting the so-separated liquid resin with a water-soluble organic liquid selected from the group consisting of ethyl alcohol, methyl alcohol, and isopropyl alcohol in amount between about 10 and 75 per cent by volume of the liquid resin; mixing with the resulting diluted liquid resin, as an aqueous solution, an alkali catalyst in amount between 0.024 and 0.182 mole of alkali calculated as NaOH per mole of phenol; introducing into the interstices of the granular filling material in the well bore, the so-prepared alkali-containing diluted liquid resin and maintaining the same therein while the diluted liquid resin spontaneously yields in situ both a solid resin and a continuous liquid phase which occupies and excludes from a portion of the interstices of the granular filling the solid resin, whereby a continuous solid phase of diluent free-resin deposits upon the particles of granular filling material cementing them together without blocking fluid flow.

References Cited in the file of this patent

UNITED STATES PATENTS

| Number | Name | Date |
|---|---|---|
| 1,896,212 | Woods | Feb. 7, 1933 |
| 2,235,193 | Balz | Mar. 18, 1941 |
| 2,240,622 | Lawson | May 6, 1941 |
| 2,366,036 | Leverett et al. | Dec. 26, 1944 |
| 2,366,078 | Williams | Dec. 26, 1944 |
| 2,389,865 | Mills et al. | Nov. 27, 1945 |